United States Patent
Ranade et al.

(10) Patent No.: US 9,183,127 B2
(45) Date of Patent: Nov. 10, 2015

(54) SEQUENTIAL BLOCK ALLOCATION IN A MEMORY

(75) Inventors: Dilip Madhusudan Ranade, Maharashtra (IN); Niranjan Pendharkar, Pune (IN); Anindya Banerjee, Pune (IN)

(73) Assignee: Symantec Corporation, Mountain View, CA (US)

( * ) Notice: Subject to any disclaimer, the term of this patent is extended or adjusted under 35 U.S.C. 154(b) by 280 days.

(21) Appl. No.: 13/528,676

(22) Filed: Jun. 20, 2012

(65) Prior Publication Data

US 2013/0346724 A1    Dec. 26, 2013

(51) Int. Cl.
*G06F 12/06* (2006.01)
*G06F 12/02* (2006.01)
*G06F 12/08* (2006.01)

(52) U.S. Cl.
CPC ............ *G06F 12/0223* (2013.01); *G06F 12/06* (2013.01); *G06F 12/08* (2013.01)

(58) Field of Classification Search
CPC .............................. G06F 12/06; G06F 12/0223
USPC ...................................................... 711/1–200
See application file for complete search history.

(56) References Cited

U.S. PATENT DOCUMENTS

| | | | |
|---|---|---|---|
| 8,595,595 B1 * | 11/2013 | Grcanac et al. | 714/770 |
| 8,661,068 B1 * | 2/2014 | Seibel et al. | 707/825 |
| 2007/0078819 A1 * | 4/2007 | Zayas et al. | 707/2 |
| 2010/0191897 A1 * | 7/2010 | Zhang et al. | 711/103 |
| 2011/0258391 A1 * | 10/2011 | Atkisson et al. | 711/118 |
| 2012/0150800 A1 * | 6/2012 | Adkins et al. | 707/624 |

OTHER PUBLICATIONS

No Author Listed, "Oracle ZFS Storage Appliance," Oracle Data Sheet, 8 pages (2014).
No Author Listed, "Sun ZFS Storage 7X20 Appliances," Oracle Spec Sheet, Oracle Data Sheet, 5 pages (2013).

* cited by examiner

*Primary Examiner* — Cheng-Yuan Tseng
*Assistant Examiner* — Zubair Ahmed
(74) *Attorney, Agent, or Firm* — Wilmer Cutler Pickering Hale and Dorr LLP

(57) ABSTRACT

A region of memory is logically divided into a number of segments, each of which is logically divided into a number of blocks. Blocks are allocated sequentially. A head pointer and a tail pointer demarcate the section of allocated blocks. As allocated blocks are added, the tail pointer is moved so that it remains at the end of the section of allocated blocks. If the tail pointer is within a threshold distance of the head pointer, then the head pointer is moved from its current position to a new position, and the allocated blocks between the current and new positions are freed (deallocated and/or erased). Thus, writes to the memory can be performed sequentially, and blocks can be freed in advance of when they are actually needed.

20 Claims, 8 Drawing Sheets

SEQUENTIAL BLOCK ALLOCATION IN A MEMORY

BACKGROUND

Conventional storage management and file relocation solutions use multi-tier storage systems to balance performance and costs. At higher tiers, performance is better but the cost is higher, while at lower tiers the cost is reduced but so is performance. Accordingly, policies can be created that will move files to higher-performance storage devices based on, for example, input/output (I/O) "temperature" (e.g., frequency of access) or service requirements (e.g., service level agreements), while unimportant or out-of-date files can be moved to less expensive storage devices without changing the way users or applications access those files.

With dynamic storage tiering (DST), files can be dynamically moved between tiers without having to take the application offline and without changing the way an application or database accesses the information. Consequently, the move is usually transparent to the users and applications that own the files. Furthermore, as data is moved between the different storage tiers, policies can be centrally managed and dynamic, and can support a heterogeneous server and storage infrastructure that does not require modifications to application, database, or backup/recovery policies.

Solid state devices or drives (SSDs) are used as one tier in a DST system as well as a cache for underlying hard disk device/drive (HDD) storage. As blocks of an SSD are used and reused, free blocks, block allocation and de-allocation (freeing of allocated blocks), and usage of allocated blocks are tracked. Traditional methods use free block lists or free block bitmaps to allocate free blocks and to free allocated blocks, but special care needs to be taken because SSDs have particular characteristics. For example, SSDs perform well for random/sequential reads and sequential writes, but do not perform as well for random writes because, before a region of SSD storage can be overwritten, it must first be erased. Erasing cannot be done for small-sized regions; instead, it must be done at the level of block size, which may be greater than or equal to 128 KB (kilo-bytes).

To mitigate the erasure penalty, SSDs now support a TRIM command or utility. The TRIM command can be issued to the SSD to inform the SSD that a certain region is to be marked "free." As a result, the SSD will not try to preserve old data during its internal block remapping and garbage collection activities. The TRIM command is also able to erase the designated region as a whole, provided the region is appropriately aligned with the erasure block boundaries.

Although mitigated by the above, some amount of penalty is still associated with the use of the TRIM command. For example, a random write to an SSD can be delayed while a decision is made whether or not a region of the SSD needs to be erased in order to provide space for the data to be written, and then further delayed while the TRIM command is executed.

SUMMARY

In an embodiment according to the present disclosure, a region of memory is logically divided into a number of segments, each of which is logically divided into a number of blocks. The memory may include only one such region, or it may include multiple such regions. In one embodiment, the memory is implemented in (using) an SSD. In one such embodiment, each segment is aligned with a respective SSD erasure block boundary. Alternatively, the memory is implemented in/using a device other than an SSD, such as but not limited to a thin provisioning array.

In embodiments according to the present disclosure, blocks are allocated sequentially (contiguously). In one embodiment, a first (head) pointer and a second (tail) pointer demarcate the section of the blocks that have been allocated. As additional blocks are allocated as a result of writes to the designated region, the additional blocks are sequentially allocated beginning at the tail pointer. If the section of allocated blocks reaches the end of the designated region, then blocks are subsequently allocated beginning at the start of the region. In other words, the allocation of blocks continues sequentially to the end of the designated region, then wraps around to the beginning of the region. Thus, according to embodiments of the present disclosure, the memory device (e.g., SSD, thin provisioning array, etc.) can be used as a circular buffer or log-structured device where writes are performed sequentially. In other words, random writes are not necessary and can be avoided.

In the present embodiment, as additional blocks are allocated, the tail pointer is moved so that it remains at the end of the section of allocated blocks and the position of the head pointer remains fixed, at least temporarily. At some point, as blocks continue to be allocated, the location of the tail pointer may approach the location of the head pointer. In the present embodiment, if the tail pointer is within a threshold distance of the head pointer, then the head pointer is moved from its current position (e.g., from a first segment or block address) to a new position (e.g., to a second segment or block address), and the allocated blocks that are between the current position and the new position are freed (erased and/or freed).

In one embodiment, the distance the head pointer is moved is equivalent to the length of a segment (e.g., the head pointer is moved the number of blocks that are in a segment, from one erasure block boundary to the next erasure boundary). In one such embodiment, allocated blocks are freed using the TRIM command.

Advantageously, blocks can be freed (e.g., using the TRIM command) in advance of when they are actually needed. In other words, the TRIM command, for example, can be executed when the tail pointer is within a threshold distance of the head pointer, as mentioned above. Thus, blocks can be freed in anticipation of a write operation. As a result, write latency is reduced.

In one embodiment, the memory device (e.g., SSD, thin provisioning array, etc.) is used as one of the tiers in a multi-tier storage system such as a DST system. In such an embodiment, before the data in the blocks about to be freed is overwritten or erased, it is first copied to another tier of the multi-tier storage system. For example, if an SSD device is used as a cache for an HDD, then the data can be copied from the SSD to the HDD, in which case the file system directs subsequent accesses to that data to the HDD.

As described above, a block might be allocated to a first file, then subsequently freed and overwritten with data for a second file. Therefore, before a block is read for data for a file, the validity of that data for the file is checked. In one embodiment, this is accomplished by maintaining a generation count for each block or segment of blocks. The value of the generation count when a block is allocated to a file is stored in a data structure (e.g., an inode) that contains information about that file, and that value is also stored in a structure maintained by the file system (e.g., a bmap). If the block is subsequently allocated to and overwritten with data for a second file, then the generation count value for the block is incremented, the new generation count value is stored in the data structure (e.g., inode) for the second file, and the file system structure (e.g., the bmap) is updated accordingly. Before a read operation is performed for the first file, the value of the generation count in the data structure (e.g., inode) for the first file is compared to the value of the generation count in the file system structure (e.g., the bmap). If the two values are different, then the data is invalid for the first file; if the two values are the same, then the data is valid for the first file. As noted above, the data for the first file can be migrated to another device before it is erased/overwritten, in which case the file system directs the read operation to the other device.

A generation count, used as just described, is beneficial because it allows the affected portion (e.g., block or segment) of the memory (e.g., SSD, thin provisioning array, etc.) to be invalidated without having to locate and then invalidate all references to that portion. For example, in a sequence (e.g., a segment) of blocks, some of the blocks can be allocated to a first file, others to a second file, still others to a third file, and so on. If that segment is overwritten, it is not necessary to locate all files that previously made reference to that sequence of blocks and then invalidate all of those files' references to those blocks. Instead, using the generation count as described above, a determination about the validity of the data is built into the read process. Consequently, it is not necessary to seek out invalid references because an invalid reference can be automatically detected as part of the read operation. Essentially, files are notified that the data is now invalid on a need-to-know basis. Thus, computational resources are conserved.

In one embodiment, the generation count is assigned a maximum value; if the maximum value is reached, then the generation count is reset to its initial value (e.g., zero) and then incremented upward from the initial value. Data may be stored in the memory (e.g., SSD, thin provisioning array, etc.) for a long period of time and so it is possible that the generation count may be reset and then incremented to a value that matches one of the values previously associated with an allocated block. In other words, if the designated region of the memory is wrapped around repeatedly, then the generation count may be incremented enough times that the count rolls around to a previous value. Thus, for example, generation count g1 may be associated with block 1 initially allocated to file 1, the generation count may eventually roll back around to g1, and then the same generation count g1 may be associated with block 1 when it is allocated to file 2. Consequently, although the data in block 1 is no longer valid for file 1, that might not be detected. Different mechanisms can be used to prevent that from happening. For example, in one embodiment, if the generation count reaches a first threshold value (e.g., that is less than the maximum value), then the file-related data structures (e.g., the inodes) can be accessed, and any references to generation counts that are less than a second threshold value (which may be equal to or less than the first threshold value) can be proactively removed from those data structures.

In summary, the memory device (e.g., SSD, thin provisioning array, etc.) can be used as a circular buffer or log-structured device where writes are performed sequentially. Advantageously, blocks in the memory can be freed (e.g., using the TRIM command) in advance of when they are actually needed, reducing write latency. Use of a generation count allows a portion of the memory to be invalidated without having to locate and then invalidate all references to that portion, conserving computational resources. These and other objects and advantages of the various embodiments of the present disclosure will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

Figure 1:
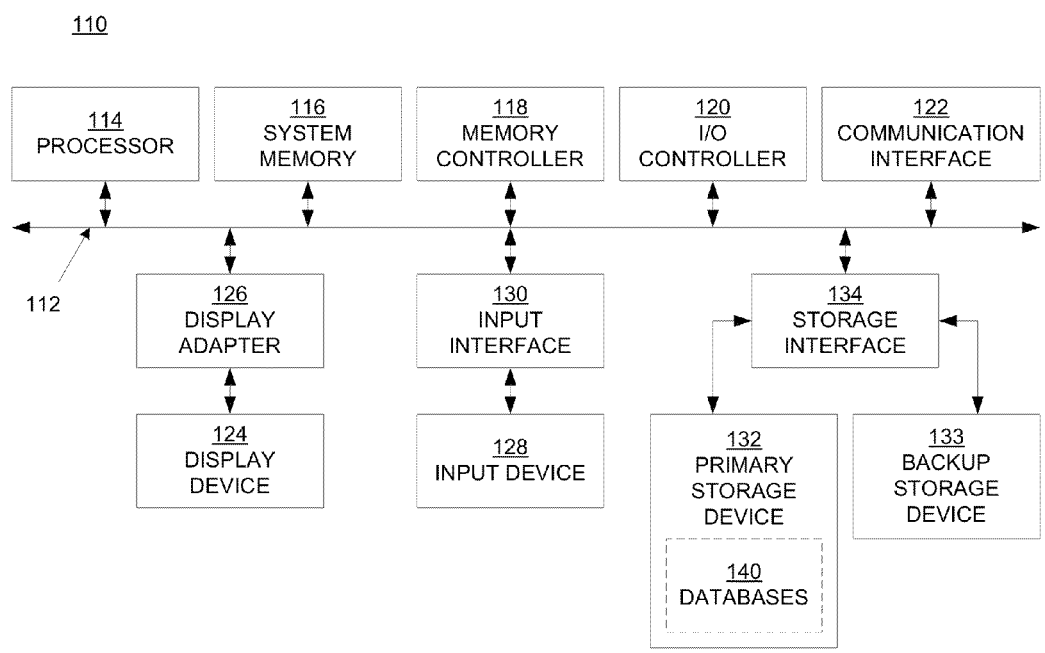
FIG. 1 is a block diagram of an example of a computer system upon which embodiments according to the present disclosure can be implemented.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "allocating," "associating," "moving," "copying," "setting," "accessing," "erasing," "freeing," "controlling," "adding," "recording," "determining," "identifying," "caching," "maintaining," "incrementing," "comparing," "removing," "reading," "writing," or the like, refer to actions and processes (e.g., flowchart 800 of FIG. 8) of a computer system or similar electronic computing device or processor (e.g., system 110 of FIG. 1). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared, and other wireless media. Combinations of any of the above can also be included within the scope of computer-readable media.

FIG. 1 is a block diagram of an example of a computing system 110 capable of implementing embodiments of the present disclosure. Computing system 110 broadly represents any single or multi-processor computing device or system capable of executing computer-readable instructions. Examples of computing system 110 include, without limitation, workstations, laptops, client-side terminals, servers, distributed computing systems, handheld devices, or any other computing system or device. In its most basic configuration, computing system 110 may include at least one processor 114 and a system memory 116.

Processor 114 generally represents any type or form of processing unit capable of processing data or interpreting and executing instructions. In certain embodiments, processor 114 may receive instructions from a software application or module. These instructions may cause processor 114 to perform the functions of one or more of the example embodiments described and/or illustrated herein.

System memory 116 generally represents any type or form of volatile or non-volatile storage device or medium capable of storing data and/or other computer-readable instructions. Examples of system memory 116 include, without limitation, RAM, ROM, flash memory, or any other suitable memory device. Although not required, in certain embodiments computing system 110 may include both a volatile memory unit (such as, for example, system memory 116) and a non-volatile storage device (such as, for example, primary storage device 132).

Computing system 110 may also include one or more components or elements in addition to processor 114 and system memory 116. For example, in the embodiment of FIG. 1, computing system 110 includes a memory controller 118, an input/output (I/O) controller 120, and a communication interface 122, each of which may be interconnected via a communication infrastructure 112. Communication infrastructure 112 generally represents any type or form of infrastructure capable of facilitating communication between one or more components of a computing device. Examples of communication infrastructure 112 include, without limitation, a communication bus (such as an Industry Standard Architecture (ISA), Peripheral Component Interconnect (PCI), PCI Express (PCIe), or similar bus) and a network.

Memory controller 118 generally represents any type or form of device capable of handling memory or data or controlling communication between one or more components of computing system 110. For example, memory controller 118 may control communication between processor 114, system memory 116, and I/O controller 120 via communication infrastructure 112.

I/O controller 120 generally represents any type or form of module capable of coordinating and/or controlling the input and output functions of a computing device. For example, I/O controller 120 may control or facilitate transfer of data between one or more elements of computing system 110, such as processor 114, system memory 116, communication interface 122, display adapter 126, input interface 130, and storage interface 134.

Communication interface 122 broadly represents any type or form of communication device or adapter capable of facilitating communication between example computing system 110 and one or more additional devices. For example, communication interface 122 may facilitate communication between computing system 110 and a private or public network including additional computing systems. Examples of communication interface 122 include, without limitation, a wired network interface (such as a network interface card), a wireless network interface (such as a wireless network interface card), a modem, and any other suitable interface. In one embodiment, communication interface 122 provides a direct connection to a remote server via a direct link to a network, such as the Internet. Communication interface 122 may also indirectly provide such a connection through any other suitable connection.

Communication interface 122 may also represent a host adapter configured to facilitate communication between computing system 110 and one or more additional network or storage devices via an external bus or communications channel. Examples of host adapters include, without limitation, Small Computer System Interface (SCSI) host adapters, Universal Serial Bus (USB) host adapters, IEEE (Institute of Electrical and Electronics Engineers) 1394 host adapters, Serial Advanced Technology Attachment (SATA) and External SATA (eSATA) host adapters, Advanced Technology Attachment (ATA) and Parallel ATA (PATA) host adapters, Fibre Channel interface adapters, Ethernet adapters, or the like. Communication interface 122 may also allow computing system 110 to engage in distributed or remote computing. For example, communication interface 122 may receive instructions from a remote device or send instructions to a remote device for execution.

As illustrated in FIG. 1, computing system 110 may also include at least one display device 124 coupled to communication infrastructure 112 via a display adapter 126. Display device 124 generally represents any type or form of device capable of visually displaying information forwarded by display adapter 126. Similarly, display adapter 126 generally represents any type or form of device configured to forward graphics, text, and other data for display on display device 124.

As illustrated in FIG. 1, computing system 110 may also include at least one input device 128 coupled to communication infrastructure 112 via an input interface 130. Input device 128 generally represents any type or form of input device capable of providing input, either computer- or human-generated, to computing system 110. Examples of input device 128 include, without limitation, a keyboard, a pointing device, a speech recognition device, or any other input device.

As illustrated in FIG. 1, computing system 110 may also include a primary storage device 132 and a backup storage device 133 coupled to communication infrastructure 112 via a storage interface 134. Storage devices 132 and 133 generally represent any type or form of storage device or medium capable of storing data and/or other computer-readable instructions. For example, storage devices 132 and 133 may be a magnetic disk drive (e.g., a so-called hard drive), a floppy disk drive, a magnetic tape drive, an optical disk drive, a flash drive, or the like. Storage interface 134 generally represents any type or form of interface or device for transferring data between storage devices 132 and 133 and other components of computing system 110.

In one example, databases 140 may be stored in primary storage device 132. Databases 140 may represent portions of a single database or computing device or it may represent multiple databases or computing devices. For example, databases 140 may represent (be stored on) a portion of computing system 110 and/or portions of example network architecture 200 in FIG. 2 (below). Alternatively, databases 140 may represent (be stored on) one or more physically separate devices capable of being accessed by a computing device, such as computing system 110 and/or portions of network architecture 200.

Continuing with reference to FIG. 1, storage devices 132 and 133 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 132 and 133 may also include other similar structures or devices for allowing computer software, data, or other computer-readable instructions to be loaded into computing system 110. For example, storage devices 132 and 133 may be configured to read and write software, data, or other computer-readable information. Storage devices 132 and 133 may also be a part of computing system 110 or may be separate devices accessed through other interface systems.

Many other devices or subsystems may be connected to computing system 110. Conversely, all of the components and devices illustrated in FIG. 1 need not be present to practice the embodiments described herein. The devices and subsystems referenced above may also be interconnected in different ways from that shown in FIG. 1. Computing system 110 may also employ any number of software, firmware, and/or hardware configurations. For example, the example embodiments disclosed herein may be encoded as a computer program (also referred to as computer software, software applications, computer-readable instructions, or computer control logic) on a computer-readable medium.

The computer-readable medium containing the computer program may be loaded into computing system 110. All or a portion of the computer program stored on the computer-readable medium may then be stored in system memory 116 and/or various portions of storage devices 132 and 133. When executed by processor 114, a computer program loaded into computing system 110 may cause processor 114 to perform and/or be a means for performing the functions of the example embodiments described and/or illustrated herein. Additionally or alternatively, the example embodiments described and/or illustrated herein may be implemented in firmware and/or hardware.

Figure 2:
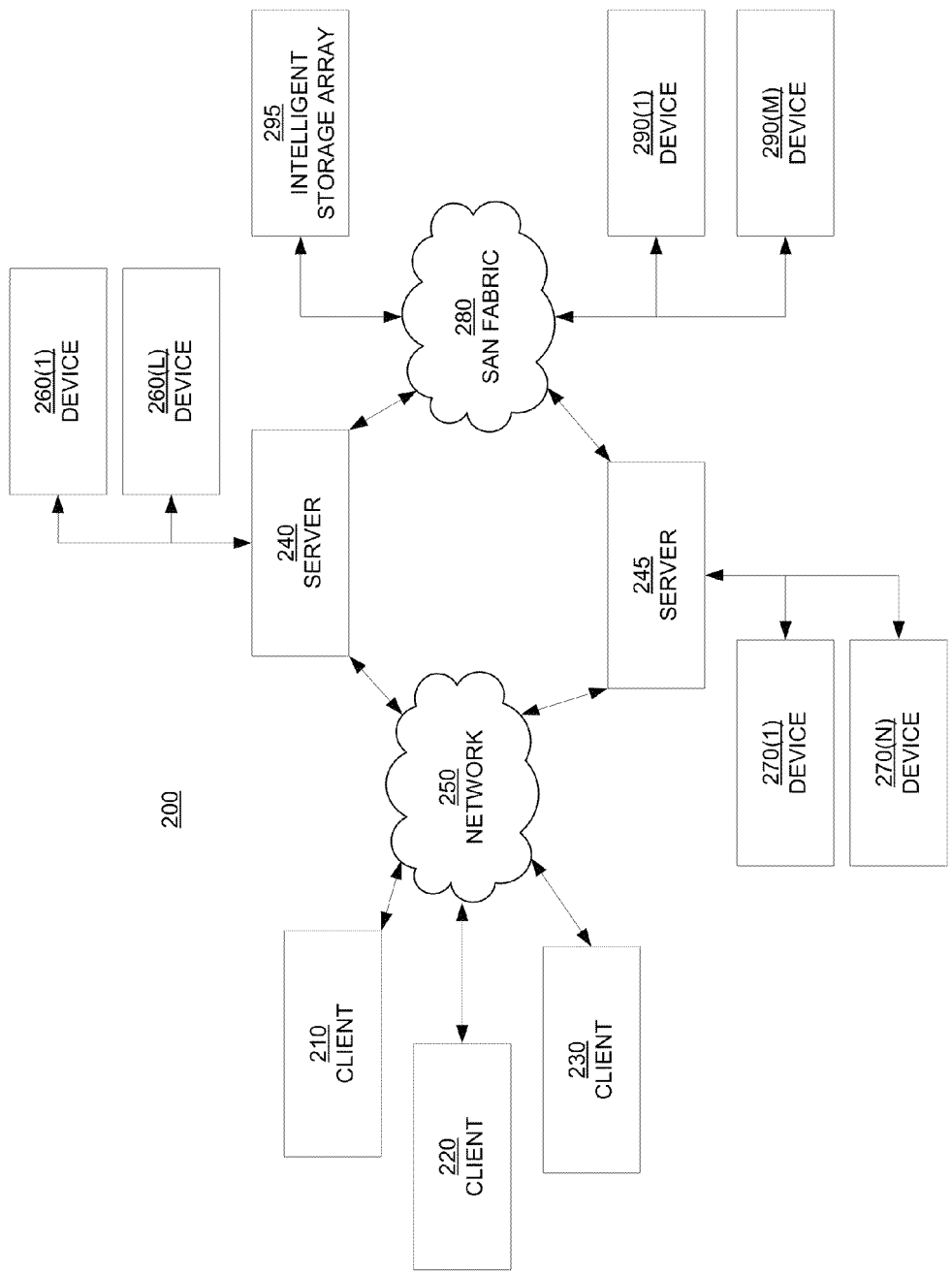
FIG. 2 is a block diagram of an example of a network architecture capable of implementing embodiments according to the present disclosure.

FIG. 2 is a block diagram of an example of a network architecture 200 in which client systems 210, 220, and 230 and servers 240 and 245 may be coupled to a network 250. Client systems 210, 220, and 230 generally represent any type or form of computing device or system, such as computing system 110 of FIG. 1.

Similarly, servers 240 and 245 generally represent computing devices or systems, such as application servers or database servers, configured to provide various database services and/or run certain software applications. Network 250 generally represents any telecommunication or computer network including, for example, an intranet, a wide area network (WAN), a local area network (LAN), a personal area network (PAN), or the Internet.

As illustrated in FIG. 2, one or more storage devices 260(1)-(L) may be directly attached to server 240. Similarly, one or more storage devices 270(1)-(N) may be directly attached to server 245. Storage devices 260(1)-(L) and storage devices 270(1)-(N) generally represent any type or form of storage device or medium capable of storing data and/or other computer-readable instructions. Storage devices 260(1)-(L) and storage devices 270(1)-(N) may represent network-attached storage (NAS) devices configured to communicate with servers 240 and 245 using various protocols, such as Network File System (NFS), Server Message Block (SMB), or Common Internet File System (CIFS).

Servers 240 and 245 may also be connected to a storage area network (SAN) fabric 280. SAN fabric 280 generally represents any type or form of computer network or architecture capable of facilitating communication between storage devices. SAN fabric 280 may facilitate communication between servers 240 and 245 and storage devices 290(1)-(M) and/or an intelligent storage array 295. SAN fabric 280 may also facilitate, via network 250 and servers 240 and 245, communication between client systems 210, 220, and 230 and storage devices 290(1)-(M) and/or intelligent storage array 295 in such a manner that devices 290(1)-(M) and array 295 appear as locally attached devices to client systems 210, 220, and 230. As with storage devices 260(1)-(L) and storage devices 270(1)-(N), storage devices 290(1)-(M) and intelligent storage array 295 generally represent any type or form of storage device or medium capable of storing data and/or other computer-readable instructions.

With reference to computing system 110 of FIG. 1, a communication interface, such as communication interface 122, may be used to provide connectivity between each client system 210, 220, and 230 and network 250. Client systems 210, 220, and 230 may be able to access information on server 240 or 245 using, for example, a Web browser or other client software. Such software may allow client systems 210, 220, and 230 to access data hosted by server 240, server 245, storage devices 260(1)-(L), storage devices 270(1)-(N), storage devices 290(1)-(M), or intelligent storage array 295. Although FIG. 2 depicts the use of a network (such as the Internet) for exchanging data, the embodiments described herein are not limited to the Internet or any particular network-based environment.

Returning to FIG. 2, in one embodiment, all or a portion of one or more of the example embodiments disclosed herein are encoded as a computer program and loaded onto and executed by server 240, server 245, storage devices 260(1)-(L), storage devices 270(1)-(N), storage devices 290(1)-(M), intelligent storage array 295, or any combination thereof. All or a portion of one or more of the example embodiments disclosed herein may also be encoded as a computer program, stored in server 240, run by server 245, and distributed to client systems 210, 220, and 230 over network 250.

Figure 3:
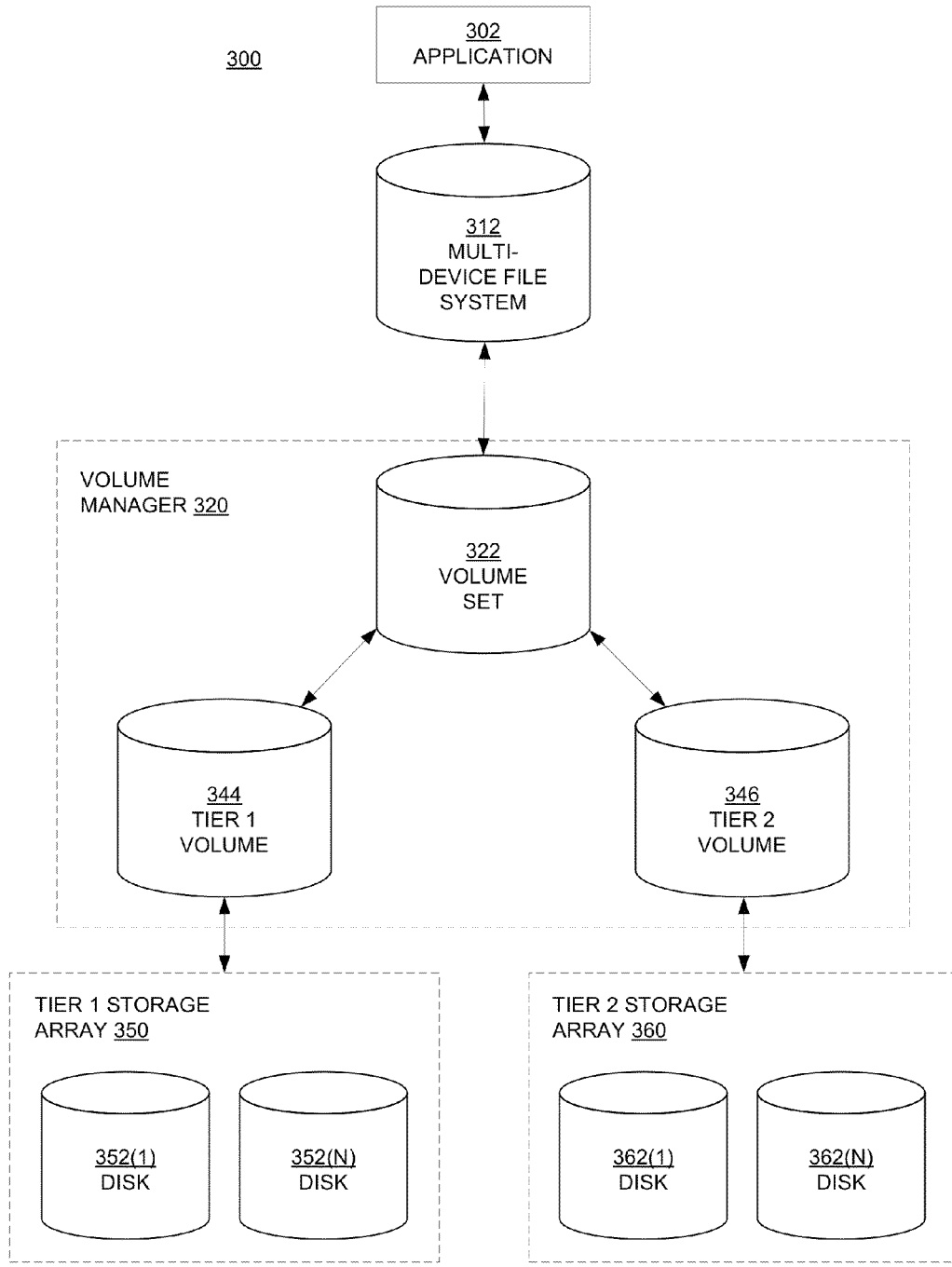
FIG. 3 is a block diagram of an example of a multi-tier storage system upon which embodiments according to the present disclosure may be implemented.

FIG. 3 is a block diagram of an example of a multi-tier storage system 300 upon which embodiments of the present disclosure may be implemented. System 300 may include an application 302 in communication with a multi-device file system 312 for multi-tier storage, which may also be referred to as dynamic storage. Multi-tier storage generally refers to the use of virtual or physical storage devices with different characteristics to provide differentiated storage for computing systems. Each tier may be ranked based on those characteristics. For example, storage devices in a multi-device file system may have different I/O performance, availability, and/or cost characteristics and may be ranked accordingly. In other words, higher-ranked tiers may result in higher performance at a higher cost/price, and lower-ranked tiers may result in lower performance at a reduced cost/price. Storage system 300 can also support multi-volume file systems through multi-device file system 312 and can provide automatic policy-based placement of portions (e.g., extents or blocks) of files.

In the FIG. 3 embodiment, volume manager 320 may implement software-based virtualization for facilitating multi-tier storage in the form of virtual volumes configured from multiple hardware devices. Volume set 322 may be divided into a tier 1 volume 344 and a tier 2 volume 346. For example, tier 1 volume 344 may include tier 1 storage array 350 (e.g., disk 352(1) through disk 352(N)). Similarly, tier 2 volume 346 may include a tier 2 storage array 360 (e.g., disk 362(1) through disk 362 (N)). Although only two tiers are shown and described below, the present disclosure is not so limited.

Tier 1 volume 344 and/or tier 2 volume 346 may be configured from enterprise disk array LUNs (logical unit number units), mid-range disk array LUNs, and/or disks connected directly to their host systems. Tier 1 volume 344 and/or tier 2 volume 346 may also represent more complex configurations, such as mirrored volumes configured from RAID (Redundant Array of Independent Disks)—5 LUNs presented by two disk arrays.

One of the tiers (e.g., tier 1 storage array 350) may be ranked as the lower of the two tiers and the other of the tiers (e.g., tier 2 storage array 360) may be ranked as the higher of the two tiers. In one embodiment, the lower-ranked tier is implemented as a hard disk device or drive (HDD), and the higher-ranked tier is implemented as a solid state device or drive (SSD). In one such embodiment, the SSD serves as a cache for the HDD. In another embodiment, tier 1 is implemented as a thin provisioning array; tier 2 may also be a thin provisioning array.

Figure 4:
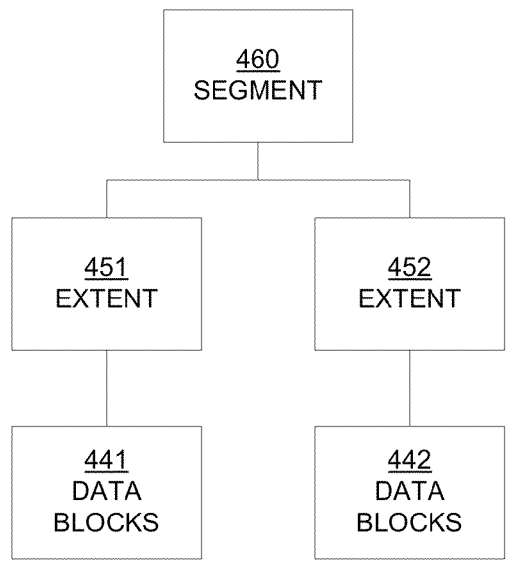
FIGS. 4 and 5 are block diagrams illustrating elements of a file system in embodiments according to the present disclosure.

In the example of FIG. 4, data is stored in contiguous data blocks 441 and contiguous data blocks 442. Each data block corresponds to a certain number of bytes of physical storage space. An extent is a specific number of contiguous data blocks. In the example of FIG. 4, segment 460 includes an extent 451 that includes data blocks 441, and also includes an extent 452 that includes data blocks 442.

Figure 5:
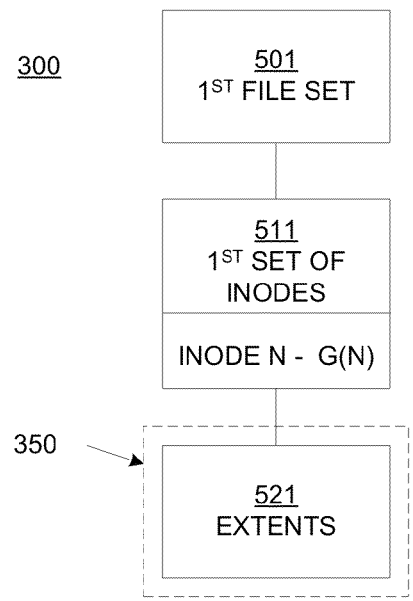

With reference to FIG. 5, in one embodiment, a file set 501 includes inodes 511. In general, as used herein, an inode refers to a data structure that contains information about a file and, in essence, maps the file to memory block addresses. By way of example, the discussion herein utilizes the term "inode," but it is understood that embodiments according to the present disclosure are not limited to data structures known as inodes. An inode is generally associated with a Unix file system, and other file systems may utilize data structures similar to or equivalent to inodes but known by a different name.

The inodes 511 in file set 501 are allocated extents 521 from a tier (e.g., tier 1 storage array 350) in multi-tier storage system 300. Each inode includes a number of fields or attributes. Information stored in an inode includes, but is not necessarily limited to, the type of file, permissions associated with the file, the link count, the file's size, and address(es) that point to data block(s) (extents) that store the actual contents of the file (that is, the file data itself). An extent is usually described in terms of an offset, a starting block, and the number of contiguous blocks in the extent. As noted above, a data structure other than an inode but providing the same functionality as an inode, and perhaps including much the same information as an inode, may be used, depending on the type of file system.

In one embodiment, a generation count G is associated with each inode. The generation count is used when a read operation is to be performed for a file. More specifically, the generation count is used to determine whether cached data (e.g., data stored in a device that is used as a cache in a multi-tier storage system) is valid or invalid for the file associated with the read operation. Additional information is provided below.

Figure 6:
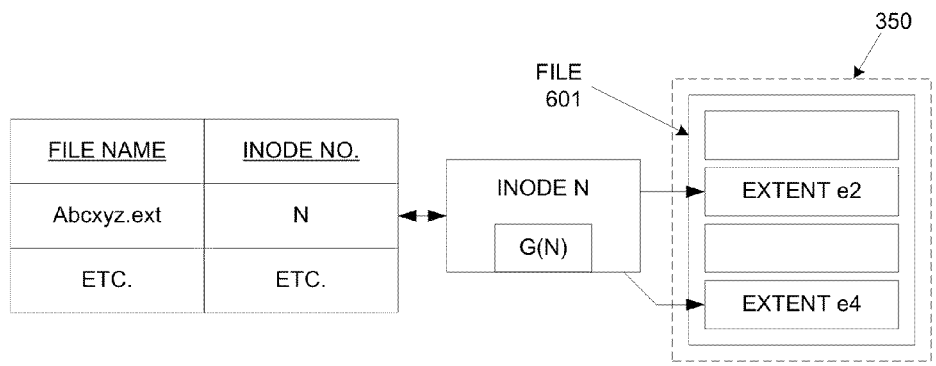
FIG. 6 illustrates a file stored in a tier of a multi-tier storage system in an embodiment according to the present disclosure.

With reference to FIGS. 5 and 6, an inode N from file set 501 is associated with a file 601 in a tier (e.g., tier 1 storage array 350 in general, which may be an SSD or thin provisioning array, for example). In the example of FIG. 6, file 601 includes extents e2 and e4. In one embodiment, when file 601 is accessed via file set 501 (e.g., via inode N), the generation count G(N) associated with inode N is checked to determine whether or not the data in extents e2 and e4 is valid for file 601. If valid, the data in those extents can be read and utilized in file 601. If invalid, the read operation is directed to another tier where valid data for file 601 is stored (e.g., tier 2 storage array 360 in general and an HDD in particular).

Using Memory as a Circular Buffer for Sequential Block Allocation

Embodiments according to this disclosure use memory as a circular buffer, analogous to a log-structured device in which updates to data are written sequentially to a continuous stream (a log). In one embodiment, the memory is implemented in (using) an SSD. Alternatively, the memory is implemented in/using a device other than an SSD, such as but not limited to a thin provisioning array.

Figure 7A:
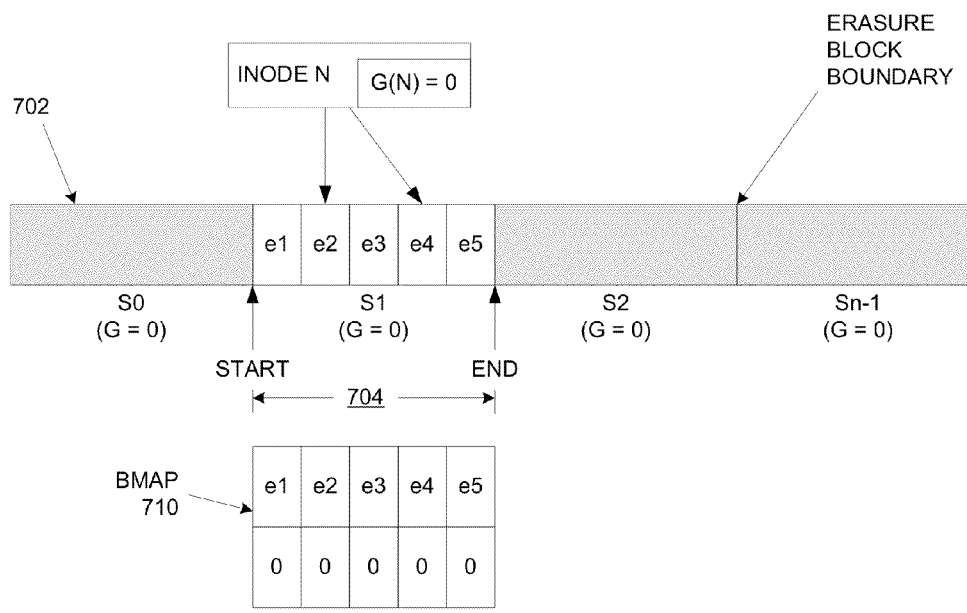
FIGS. 7A, 7B, 7C, 7D, and 7E illustrate allocating and freeing blocks in a device such as an SSD or a thin provisioning array in a multi-tier storage system such as a DST system in an embodiment according to the present disclosure.

FIG. 7A is a representation of a region 702 in the memory of a memory device (e.g., tier 1 storage array 350 of FIG. 3, an SSD or a thin provisioning array, etc.) in an embodiment according to the present disclosure. In the embodiment of 7A, region 702 is logically subdivided into several segments S0, S1, ..., Sn−1. In an SSD embodiment, each segment is aligned with a respective SSD erasure block boundary. Each segment can include one or more extents (e.g., segment S1 includes extents e1-e5), and each extent can include one or more blocks (see FIG. 4). The extents in a segment may be referenced by different files (e.g., inodes); for example, file 601 (inode N) may reference extents e2 and e4, while another file or files may respectively reference extents e1, e3, and e5. In other words, while the allocated blocks may be contiguous, the blocks referenced by a particular file may not be. The memory may include a single region such as region 702, or the memory may be partitioned into several such regions.

Figure 7B:
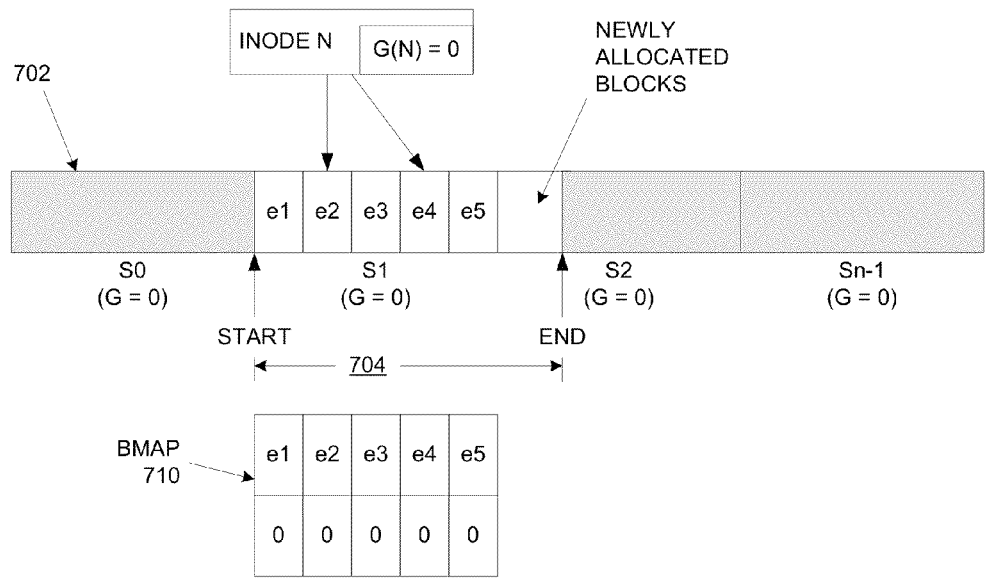

With reference to FIGS. 7A and 7B, a first (head) pointer ("start") and a second (tail) pointer ("end") are used to demarcate a section 704 of region 702 that includes allocated blocks. The head pointer refers to the first allocated block in section 704, and the tail pointer refers to the successor of the last allocated block in section 704. The successor of a block b is (b+1)mod M, where M is the total number of addressable blocks in region 702.

With reference to FIG. 7B, blocks are sequentially allocated beginning at the tail pointer. Because the blocks are allocated sequentially, the blocks in section 704 are contiguous. As additional blocks are allocated, the length of section 704 increases and the tail pointer is incremented accordingly. That is, as additional blocks are allocated, the tail pointer is moved to the resulting new end of section 704.

Figure 7C:
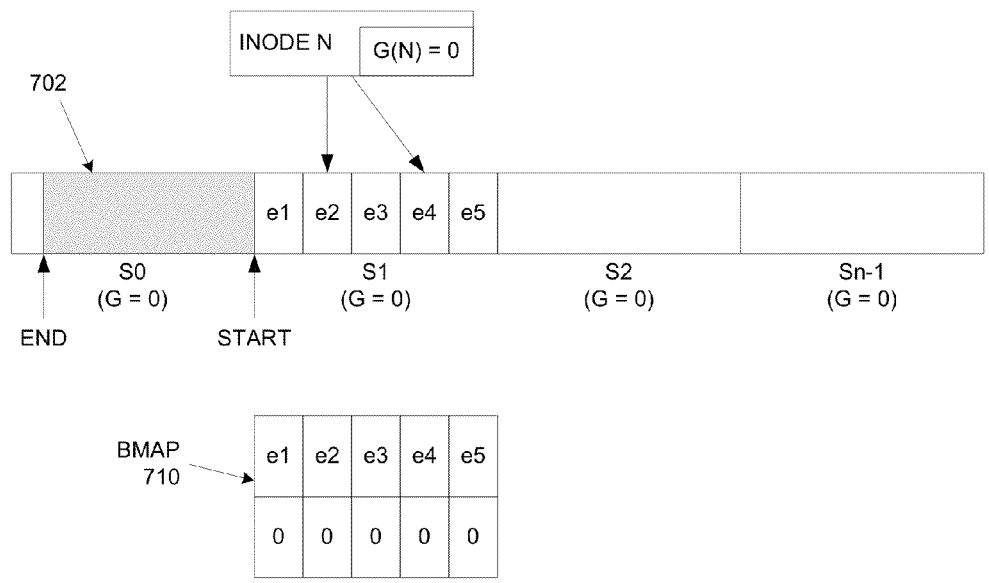

With reference to FIG. 7C, when the allocated blocks (section 704) reach the end of region 702, then new blocks are allocated starting at the beginning of region 702. Accordingly, when the tail pointer reaches the end of region 702, it wraps around to the beginning of region 702 and then advances from that point.

Figure 7D:
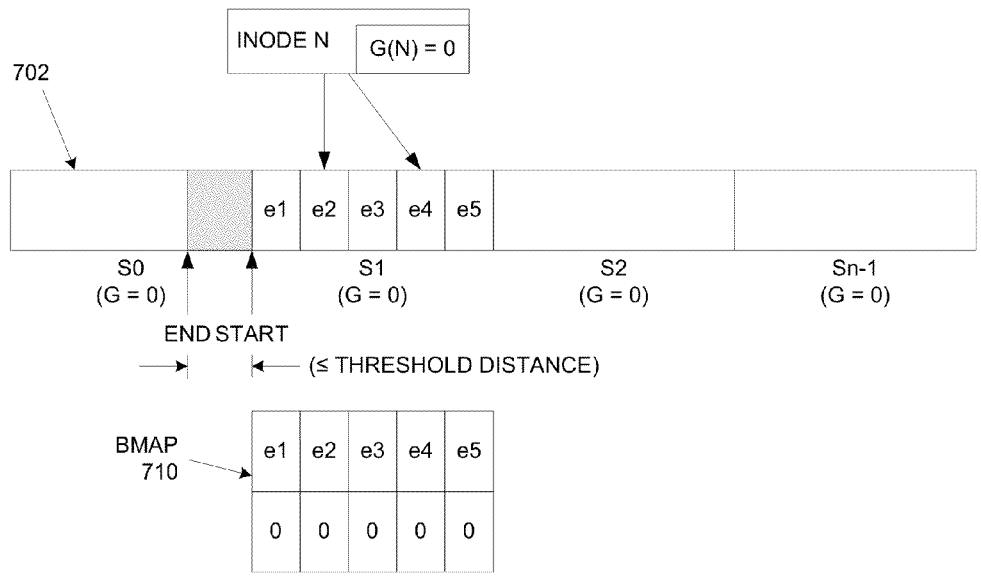
Figure 7E:
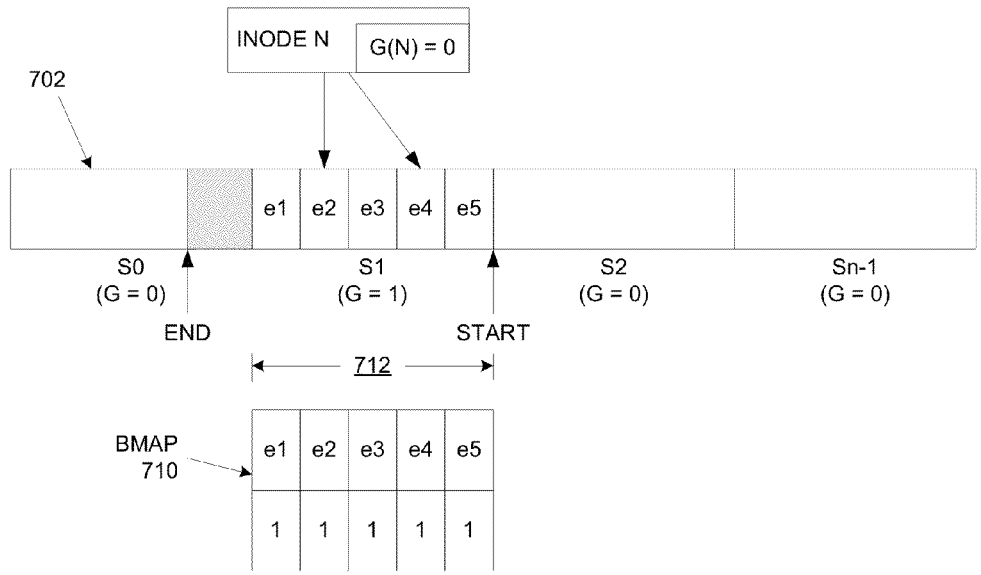

With reference to FIGS. 7D and 7E, if the tail pointer starts to overtake the head pointer, then the head pointer is moved. More specifically, in one embodiment, if the tail pointer moves to within a threshold distance of the head pointer, then the head pointer is moved. The threshold distance can be measured in a variety of ways. For example, the threshold distance may be measured by the number of blocks between the tail pointer and the head pointer, or it may be measured by the difference in addresses or offsets for the tail pointer and head pointer.

In the example of FIG. 7E, the distance the head pointer is moved is equivalent to the length of a segment (e.g., the head pointer is moved the number of blocks that are in a segment, from one erasure block boundary to the next erasure boundary). However, the head pointer can instead be moved some number of blocks less than the length of a segment, or can be moved a distance greater than a length of a single segment. The distance the head pointer is incremented can be different from the distance the tail pointer is incremented; for example, the tail pointer may be incremented block-by-block, while the head pointer may be incremented segment-by-segment. If the head pointer reaches the end of region 702, it can also wrap around to the beginning of the region like the tail pointer.

Also, after the head pointer is moved, the blocks 712 that are between the head pointer's previous position and its new position are freed. In one such embodiment, allocated blocks are freed using the TRIM command. Advantageously, in embodiments according to the present disclosure, blocks can be freed in advance of when they might actually be needed. In other words, because the TRIM command, for example, is proactively executed when the tail pointer is within a threshold distance of the head pointer, blocks can be freed before the next write operation occurs. Consequently, it is not necessary to wait for a write operation to begin in order to make a decision about whether it necessary to free blocks in order to have enough free blocks to accommodate the write, and then wait some more for the TRIM command, for example, to be executed. As a result, write latency is reduced.

With reference to FIGS. 7A-7E, a generation count value G is associated with each segment in region 702. In the examples of FIGS. 7A-7E, an initial value of the generation count (e.g., zero) is associated with each segment when region 702 is partitioned into segments. Alternatively, a generation count value can be associated as part of the process of allocating a block to a file.

In one embodiment, the current generation count value for the corresponding segment is stored by the file system using a file-to-device translation table (e.g., bmap 710). The data structure (e.g., inode N of FIG. 6) for the file (e.g., file 601 of FIG. 6) that references the allocated blocks also records the segment generation count associated with the block at the time the block was allocated to the file. Essentially, in one embodiment, the segment generation count is recorded as a cookie in inode N.

Thus, in the examples of FIGS. 6 and 7A-7E, when the blocks in extents e2 and e4 are first allocated to file 601, the current value (e.g., 0) of the generation count is stored in inode N (the data structure that contains information about file 601) and is also recorded in bmap 710.

According to embodiments of the present disclosure, if the head pointer is advanced to a new position, the value of the generation count of the blocks (or segment) that the head pointer was advanced over is incremented. Thus, in the example of FIG. 7E, the generation count value for section S1 is incremented to a new value (e.g., 1). Consequently, if blocks 712 including the extents e2 and e4 previously allocated to file 601 are subsequently allocated to a second file (that is, a file other than file 601 of FIG. 6), then the new value of the generation count will be recorded in the data structure (e.g., inode) for the second file. The bmap 710 is also updated to record the new value (e.g., 1) of the generation count associated with blocks 712 including extents e2 and e4 as shown in FIG. 7D.

Before a read operation is performed for the file 601, the value of the generation count in the data structure (e.g., inode N) for the file is compared to the value of the generation count in the file system structure (e.g., bmap 710). If the two values are different, then the data is invalid for file 601; if the two values are the same, then the data is valid for file 601.

Thus, in the examples of FIGS. 7A-7E, if a read operation is performed in the periods represented by FIGS. 7A-7D (before the head pointer is incremented as shown in FIG. 7E), then the value of the generation count in inode N is equal to the value of the generation count for extents e2 and e4 in bmap 710. Thus, up to the point before the head pointer is moved, the data in extents e2 and e4 (and, correspondingly, the data in the blocks that comprise extents e2 and e4) is valid for file

601. After the head pointer is moved, the value of the generation counts for extents e2 and e4 is different from the generation count value stored in inode N. Thus, if a read operation is performed at or after the point in time represented by FIG. 7E, then the data in extents e2 and e4 is not valid for file 601.

The use of a generation count in the manner just described is beneficial because it allows the affected portion (e.g., segment S1) of the memory device (e.g., SSD, thin provisioning array, etc.) to be invalidated for file 601, for example, without having to locate and then invalidate the references to that portion in inode N. Generally speaking, in a sequence (e.g., a segment) of blocks, some of the blocks can be allocated to a first file, other blocks to a second file, still other blocks to a third file, and so on. If that segment is overwritten (erased and re-allocated), it is not necessary to locate all files that previously referenced that sequence of blocks and then invalidate all of those files' references to those blocks. Instead, using the generation count as described above, a determination about the validity of the data is built into the read process. Consequently, it is not necessary to seek out invalid references because an invalid reference can be automatically detected as part of the read operation. Essentially, files are notified that the data is now invalid on a need-to-know basis. Thus, computational resources are conserved.

When, for example, an SSD is being used as a tier in a DST system that also includes an HDD as described previously herein, then an extra data structure is maintained. That data structure contains a list of all the files that store data in a particular SSD segment. Before that segment is freed, the data is migrated back to the HDD by traversing the affected files.

As mentioned above, the memory can be partitioned into a number of regions such as region 702, in which case the approach described above is applied to each such region. In one embodiment, each region is chosen to be used either for pure read caching or for pure write caching. Thus, the amount of memory to be used for write caching can be adjusted dynamically on demand.

Because the generation counts may be stored in the file system for a very long period of time, it may happen that a generation count gets incremented repeatedly until it rolls around to the previous value again, and therefore the stored generation count will match the current generation count even though the old data is gone. For example, region 702 may be wrapped around so many times that the current generation count of a block is incremented through values $g1$, $g1+1$, $g1+2$, etc., until it reaches a maximum value and rolls around to zero, and then is incremented again to a value of $1, 2, \ldots, g1-1$ and finally back to $g1$. If an inode, for example, contains a reference to a block with generation count $g1$, a read to that block through that inode will not detect that the data is invalid because the generation count $g1$ previously recorded in the inode matches the current generation count of the block, also $g1$, even though that block is no longer allocated to the file associated with that inode.

One solution is to freeze the file system and invalidate all affected bmaps when the generation count overflows. Another solution is possible when the bmaps are kept in a different file set. Then, the whole file set is marked invalid and a new empty file set is set up for fresh caching. The old file set can be removed in the background.

In another solution, when the generation count reaches its maximum value, operations on the file system are stopped and all references to blocks are deleted. Thus, the memory (e.g., SSD, thin provisioning array, etc.) is reset to an initial, empty state and restarted with a generation count of zero.

In yet another solution, two threshold values G1 and G2 are specified. The first threshold G1 is less than the maximum value for the generation counts, and the second threshold G2 is less than or equal to the first threshold. In this embodiment, when the generation count reaches the first threshold G1, then the file-related data structures (e.g., inodes) are accessed in the background in some sort of fixed order, and any reference to a generation count less than the second threshold G2 is removed from those data structures. Thus, while the current value of the generation count is in the range of the first threshold G1 to the maximum value, references to generation counts in the range of 0 to the second threshold G2 have been removed. Subsequently, and in a similar manner, when the current generation count reaches its maximum value and rolls over to 0, references to generation counts in the range of the first threshold G1 to the maximum value are removed from file-related data structures (e.g., inodes) in the background. In this embodiment, enough time is available to allow the background process to be completed before the possibility of a duplicated generation count becomes a reality. That is, the amount of time it takes to increment the generation count from the first threshold G1 to the maximum value (which is the amount of time it takes the tail pointer to wrap around the region 702 M minus G1 times, where M is the maximum value of the generation count) is available to complete the process of removing references to generation counts in the range of 0 to G2. Similarly, the amount of time it takes to increment the generation count from 0 to G2 is available to remove references to generation counts in the range of G1 to the maximum value.

Figure 8:
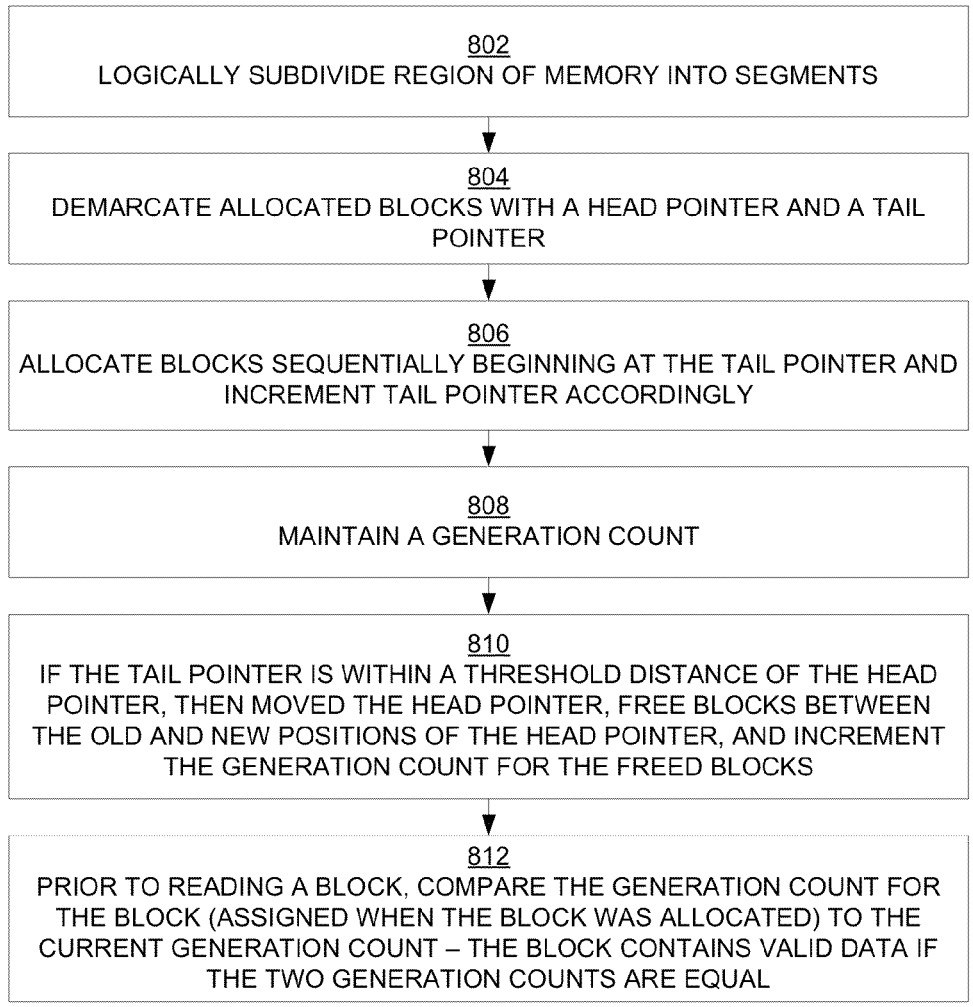
FIG. 8 is a flowchart of an example of a computer-implemented method for allocating and freeing blocks in a device such as an SSD or a thin provisioning array in a multi-tier storage system such as a DST system in an embodiment according to the present disclosure.

FIG. 8 is a flowchart 800 of an example of a computer-implemented process for allocating and freeing blocks in a device such as an SSD, thin provisioning array, etc., in a multi-tier storage system such as a DST system according to embodiments of the present disclosure. Flowchart 800 can be implemented as computer-executable instructions residing on some form of computer-readable storage medium (e.g., using computing system 110 of FIG. 1).

In block 802 of FIG. 8, with reference also to FIG. 7A, a memory device (e.g., tier 1 storage array 350 of FIG. 3, an SSD, thin provisioning array, etc.) is accessed, and a region 702 in the memory is logically subdivided into several segments. In an SSD embodiment, each segment is aligned with a respective SSD erasure block boundary. Each segment can include one or more extents, and each extent can include one or more blocks (see FIG. 4). The memory may include a single region such as region 702, or the memory may be partitioned into several such regions.

In block 804 of FIG. 8, with reference also to FIGS. 7A and 7B, a head pointer and a tail pointer are used to demarcate a section 704 of allocated blocks. The head pointer refers to the first allocated block in section 704, and the tail pointer refers to the successor of the last allocated block in section 704.

In block 806 of FIG. 8, with reference also to FIG. 7B, blocks are sequentially allocated beginning at the tail pointer, and the tail pointer is incremented accordingly to the resultant end of section 704. If the section of allocated blocks reaches the end of region 702, then blocks are allocated starting from the beginning of region 702. Similarly, the tail pointer wraps around the end of region 702 to the beginning of region 702 (see FIG. 7C).

In block 808 of FIG. 8, a generation count is maintained. The value for the generation count is associated with a block in region 702 when that block is allocated to a file. That generation count value is recorded in a data structure (e.g., an inode) that includes information about the file.

In block 810 of FIG. 8, with reference also to FIGS. 7D and 7E, if the tail pointer is within a threshold distance of the head pointer, then the head pointer is moved from a first address to a second address in region 702, and allocated blocks that are between the first address and the second address are freed. In one embodiment, the blocks are freed (e.g., erased) using the TRIM command. Also, the generation count value associated with the blocks between the first and second addresses is incremented.

In block 812 of FIG. 8, prior to reading a block in region 702, a first generation count value for the block is compared to a second generation count value, where the first generation count value is the current generation count value for the block and the second generation count value is a generation count value that was recorded (e.g., in an inode) when the block was allocated to a file. Data in the block is valid for the file if the first generation count value and the second generation count value are equal; otherwise, the data is invalid for the file.

In summary, in embodiments according to the present disclosure, a memory (e.g., an SSD, a thin provisioning array, etc.) can be used as a circular buffer or log-structured device where writes are performed sequentially. Advantageously, blocks in the memory can be freed (e.g., using the TRIM command) in advance of when they are actually needed, reducing write latency. Use of a generation count allows a portion of the memory to be invalidated without having to locate and then invalidate all references to that portion, conserving computational resources.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. A computer-readable storage medium having computer-executable instructions for causing a computer system to perform a method comprising:
    accessing a memory, wherein a region of said memory is logically divided into a plurality of blocks, wherein a first pointer and a second pointer demarcate a section of said blocks that are allocated, and wherein said first pointer and said second pointer are separate and distinct pointers that point to specific addresses in said region;
    allocating additional blocks beginning at said second pointer, wherein if said section of allocated blocks reaches an end of said region then blocks are subsequently allocated beginning at a start of said region;
    in response to said allocating, moving said second pointer to a resultant end of said section of allocated blocks such that said second pointer switches its location from subsequent to prior said first pointer in said region; and
    if said second pointer is within a threshold distance of said first pointer, then moving said first pointer from a first address to a second address in said region, and freeing allocated blocks that are between said first address and said second address prior to beginning a next write operation to said region, wherein said second address is subsequent to said first address in said region.

2. The computer-readable storage medium of claim 1 wherein said method further comprises:
    maintaining a generation count, wherein a first value for said generation count is associated with a block in said region when said block is allocated to a file; and
    recording said first value in a data structure that comprises information about said file.

3. The computer-readable storage medium of claim 2 wherein said method further comprises:
    incrementing said generation count in response to moving said first pointer;
    comparing a current value for said generation count to a first threshold value that is less than or equal to a specified maximum value; and
    if said current value is greater than said first threshold value, then removing reference to said first value from said data structure.

4. The computer-readable storage medium of claim 3 wherein said method further comprises, if said generation count reaches said maximum value, then:
    setting said generation count to an initial value;
    identifying data structures that include generation count values that are greater than a second threshold value, wherein said second threshold value is less than or equal to said first threshold value; and removing references to said generation count values from said data structures.

5. The computer-readable storage medium of claim 1 wherein said method further comprises:
associating a generation count value with each block in said region; and
in response to moving said first pointer, incrementing a generation count value associated with a block that is between said first address and said second address.

6. The computer-readable storage medium of claim 1 wherein said method further comprises:
associating a generation count value with each block in said region; and
prior to reading a block in said region, comparing a first generation count value for said block to a second generation count value, wherein said first generation count value is a current generation count value for said block, wherein said second generation count value is a generation count value that was recorded when said block was allocated to a file, and wherein data in said block is valid for said file if said first generation count value and said second generation count value are equal.

7. The computer-readable storage medium of claim 1 wherein said freeing comprises erasing blocks between said first address and said second address using a TRIM command.

8. The computer-readable storage medium of claim 1 wherein said freeing comprises copying blocks between said first address and said second address from a first device comprising said memory to a second device in a multi-tier storage system.

9. A computer system comprising:
a processor; and
memory coupled to said processor, wherein a region of said memory is logically divided into a plurality of blocks, said computer system operable to execute operations comprising:
controlling a head pointer and a tail pointer to demarcate a section of said blocks that are allocated, wherein said head pointer and said tail pointer are separate and distinct pointers that point to specific addresses in said region;
adding allocated blocks to said section beginning at said tail pointer, wherein if said section of allocated blocks reaches an end of said region then said section wraps around to a beginning of said region;
in response to said adding, moving said tail pointer to a resultant end of said section of allocated blocks such that said tail pointer switches its location from subsequent to prior said head pointer in said region; and
if said tail pointer is within a threshold distance of said head pointer, then moving said head pointer from a first address to a second address in said region, and freeing allocated blocks that are between said first address and said second address prior to beginning a next write operation to said region, wherein said second address is subsequent to said first address in said region.

10. The computer system of claim 9 wherein said operations further comprise:
maintaining a generation count, wherein a first value for said generation count is associated with a block in said region when said block is allocated to a file; and
recording said first value in a data structure that comprises information about said file.

11. The computer system of claim 10 wherein said operations further comprise:
incrementing said generation count in response to moving said head pointer;
comparing a current value for said generation count to a first threshold value that is less than or equal to a specified maximum value;
if said current value is greater than said first threshold value, then removing reference to said first value from said data structure; and
if said generation count reaches said maximum value, then:
setting said generation count to an initial value;
identifying data structures that include generation count values that are greater than a second threshold value, wherein said second threshold value is less than or equal to said first threshold value; and
removing references to said generation count values from said data structures.

12. The computer system of claim 9 wherein said memory is implemented using a device selected from the group consisting of: a solid state drive; a thin provisioning array.

13. The computer system of claim 9 wherein said operations further comprise:
associating a generation count value with each block in said region; and
in response to moving said head pointer, incrementing a generation count value associated with a block that is between said first address and said second address.

14. The computer system of claim 9 wherein said operations further comprise:
associating a generation count value with each block in said region; and
prior to reading a block in said region, comparing a first generation count value for said block to a second generation count value, wherein said first generation count value is a current generation count value for said block, wherein said second generation count value is a generation count value that was recorded when said block was allocated to a file, and wherein data in said block is valid for said file if said first generation count value and said second generation count value are equal.

15. A computer-implemented method comprising:
accessing a memory, wherein a region of said memory is logically divided into a plurality of blocks, wherein a head pointer and a tail pointer demarcate a section of said blocks that are allocated, wherein said head pointer and said tail pointer are separate and distinct pointers that point to specific addresses in said region;
allocating additional blocks beginning at said tail pointer, wherein if said section of allocated blocks reaches an end of said region then blocks are subsequently allocated beginning at a start of said region;
in response to said allocating, moving said tail pointer to a resultant end of said section of allocated blocks such that said tail pointer switches its location from subsequent to prior said head pointer in said region;
associating a generation count value with each block in said region; and
prior to reading a block in said region, comparing a first generation count value for said block to a second generation count value, wherein said first generation count value is a current generation count value for said block, wherein said second generation count value is a generation count value that was recorded when said block was allocated to a file, and wherein data in said block is valid for said file if said first generation count value and said second generation count value are equal.

16. The computer-implemented method of claim 15 further comprising, if said tail pointer is within a threshold distance of said head pointer, then moving said head pointer from a first address to a second address in said region, incrementing said current generation count, and freeing allocated blocks that are between said first address and said second address prior to beginning a next write operation to said region, wherein said second address is subsequent to said first address in said region.

17. The computer-implemented method of claim 15 further comprising recording said first generation count value in a data structure that comprises information about said file.

18. The computer-implemented method of claim 15 further comprising:
- comparing a current value for said generation count value to a first threshold value that is less than or equal to a specified maximum value; and
- if said current value is greater than said first threshold value, then removing reference to said first generation count value from said data structure.

19. The computer-implemented method of claim 18 further comprising, if said generation count reaches said maximum value, then:
- setting said generation count value to an initial value;
- identifying data structures that include generation count values that are greater than a second threshold value, wherein said second threshold value is less than or equal to said first threshold value; and
- removing references to said generation count values from said data structures.

20. The computer-implemented method of claim 15 further comprising incrementing a generation count value associated with a block that is between said first address and said second address.

* * * * *